(12) United States Patent
Latash et al.

(10) Patent No.: US 12,681,488 B1
(45) Date of Patent: Jul. 14, 2026

(54) INTEGRATED COMMUNICATION KIT FOR AUTONOMOUS ROBOTS

(71) Applicant: Georgia Tech Research Corporation, Atlanta, GA (US)

(72) Inventors: Elizaveta Latash, Atlanta, GA (US); Clayton Kerce, Atlanta, GA (US)

(73) Assignee: GEORGIA TECH RESEARCH CORPORATION, Atlanta, GA (US)

( * ) Notice: Subject to any disclaimer, the term of this patent is extended or adjusted under 35 U.S.C. 154(b) by 0 days.

(21) Appl. No.: 19/224,531

(22) Filed: May 30, 2025

(51) Int. Cl.
| | |
|---|---|
| *G05D 1/2285* | (2024.01) |
| *G05D 109/20* | (2024.01) |
| *G05D 111/30* | (2024.01) |
| *G06F 3/01* | (2006.01) |

(52) U.S. Cl.
CPC .......... *G05D 1/2285* (2024.01); *G06F 3/017* (2013.01); *G05D 2109/20* (2024.01); *G05D 2111/30* (2024.01)

(58) Field of Classification Search
CPC ............. G05D 1/2285; G05D 2109/20; G05D 2111/30; G06F 3/017
USPC ........................................................... 701/2
See application file for complete search history.

(56) References Cited

U.S. PATENT DOCUMENTS

| | | | | | |
|---|---|---|---|---|---|
| 10,545,495 | B2 * | 1/2020 | Kim | ...................... | G06F 3/0346 |
| 12,236,705 | B1 * | 2/2025 | Ulutan | .................. | G01S 17/931 |
| 2009/0222149 | A1 * | 9/2009 | Murray | ................. | B64U 10/10 |
| | | | | | 701/2 |

| | | | | | |
|---|---|---|---|---|---|
| 2014/0063055 | A1 * | 3/2014 | Osterhout | ............ | G02B 27/017 |
| | | | | | 345/633 |
| 2016/0070264 | A1 * | 3/2016 | Hu | ........................... | G08G 5/55 |
| | | | | | 701/2 |
| 2016/0259421 | A1 * | 9/2016 | Gollakota | ............... | G06F 3/017 |
| 2017/0023937 | A1 * | 1/2017 | Loianno | ................... | G08G 5/57 |
| 2017/0039859 | A1 * | 2/2017 | Hu | ........................... | G08G 5/57 |
| 2017/0180336 | A1 * | 6/2017 | Josephson | ............... | G06F 21/32 |
| 2017/0251179 | A1 * | 8/2017 | Smolyanskiy | ....... | G05D 1/0094 |
| 2017/0272842 | A1 * | 9/2017 | Touma | ............... | A63B 24/0003 |
| 2017/0351253 | A1 * | 12/2017 | Yang | .................... | G05D 1/0033 |
| 2018/0173220 | A1 * | 6/2018 | Wang | .................... | B64U 30/20 |
| 2018/0246529 | A1 * | 8/2018 | Hu | ........................ | G05D 1/0038 |
| 2018/0251219 | A1 * | 9/2018 | Taylor | .................... | G06V 20/13 |
| 2019/0056725 | A1 * | 2/2019 | Su | ........................... | G06F 1/163 |
| 2019/0187692 | A1 * | 6/2019 | Kim | ......................... | G06F 3/00 |

(Continued)

OTHER PUBLICATIONS

Latash, Elizaveta M., Front Line Integrated Communications Kit (FLICK), GTRIIRAS 2024 Journal.

(Continued)

*Primary Examiner* — Mohamed Abdo Algehaim
(74) *Attorney, Agent, or Firm* — Blank Rome LLP

(57) ABSTRACT

A method is disclosed for controlling an autonomous robot. The method detects one or more signals received from one or more sensors on a user. The one or more signals can correspond to gestures associated with the user. The method determines a derivate of a signal of the one or more signals associated with a sensor of the one or more sensors. The method further determines a motion epoch associated with the gestures based on a filtered version of the derivative of the signal. The method further determines a predicted gesture corresponding to the motion epoch using a gesture prediction model. And the method sends one or more control signals to the autonomous robot in response to the predicted gesture.

15 Claims, 14 Drawing Sheets

(56) References Cited

U.S. PATENT DOCUMENTS

| 2020/0183379 | A1* | 6/2020 | Kim | G06V 40/28 |
| 2020/0272144 | A1* | 8/2020 | Yang | B64U 10/14 |
| 2021/0232224 | A1* | 7/2021 | Cipoletta | G06F 3/0482 |
| 2021/0247758 | A1* | 8/2021 | Miehlbradt | G05D 1/223 |
| 2022/0121284 | A1* | 4/2022 | Walsh | G06F 3/014 |
| 2023/0076452 | A1* | 3/2023 | Wu | H04L 67/12 |
| 2023/0168694 | A1* | 6/2023 | Ching | G05D 1/2285 |
| | | | | 701/3 |
| 2025/0103063 | A1* | 3/2025 | Matsuzaki | G05D 1/686 |
| 2025/0181172 | A1* | 6/2025 | Yeo | G06F 3/017 |

OTHER PUBLICATIONS

Latash, Elizaveta et al., FLICK, Front Line Integrated Communications Kit, GTRIIRAD 2024, poster.
Ryan, Mick and Hinote, Clint. Uncrewed Systems and the Transformation of U.S. Warfighting Capacity. War on the Rocks—Texas National Security Review, 2024.
Kelley, Samantha Murphy. Apple Watch's new gesture control feature will have everyone tapping the air. CNN, 2023. Available online: https://www.cnn.com/2023/09/20/tech/double-tap-gesture-apple-watch.

* cited by examiner

200

Wearable Device 202

Processor 204

Memory 206

Gesture Prediction Module 226

Encoding Module 236

Sensor(s) 208

Accelerometer 210

Gyroscope 212

Magnetometer 214

Display 216

Radio 218

Input/Output Interface 220

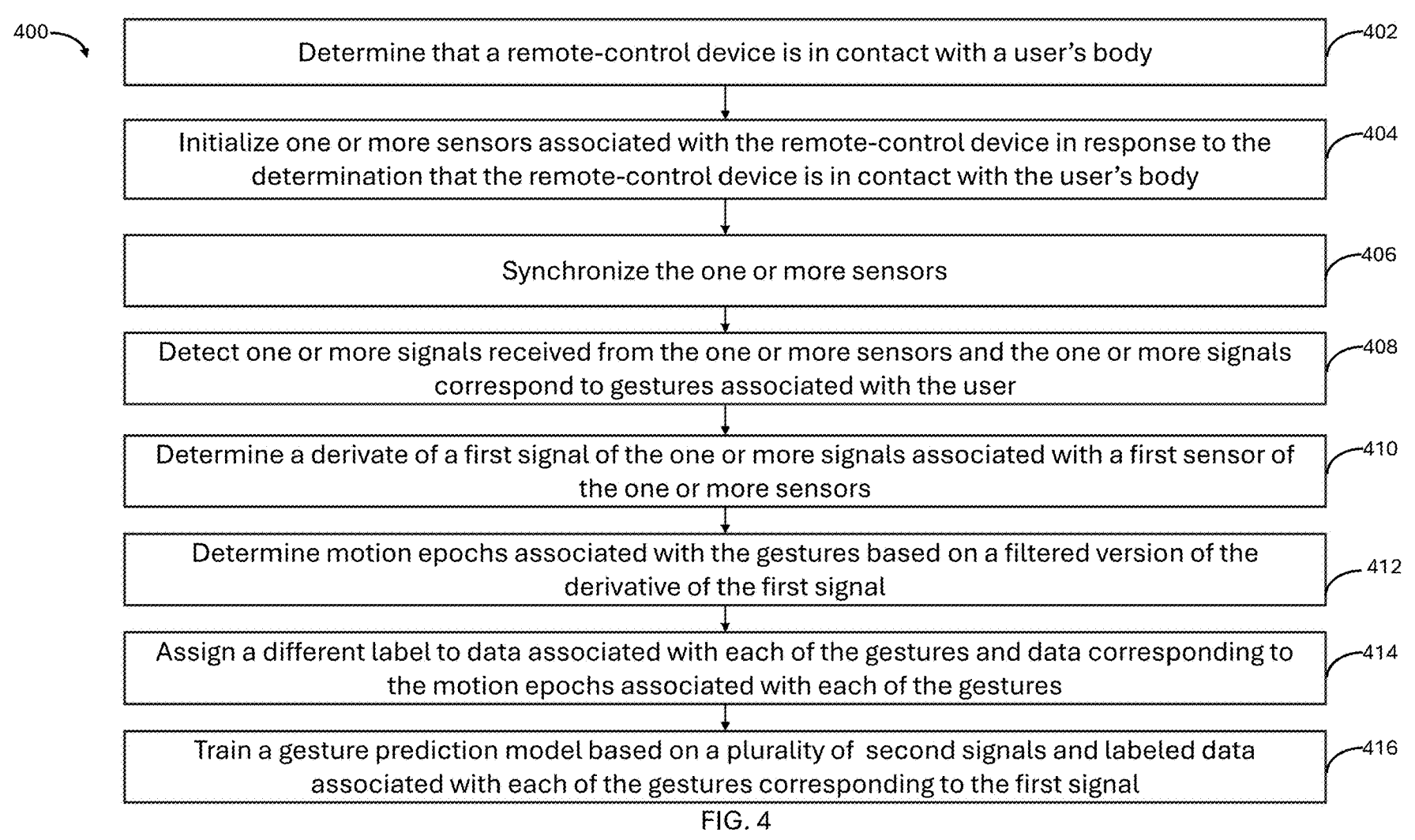

400

402 — Determine that a remote-control device is in contact with a user's body

404 — Initialize one or more sensors associated with the remote-control device in response to the determination that the remote-control device is in contact with the user's body 406 — Synchronize the one or more sensors 408 — Detect one or more signals received from the one or more sensors and the one or more signals correspond to gestures associated with the user 410 — Determine a derivate of a first signal of the one or more signals associated with a first sensor of the one or more sensors 412 — Determine motion epochs associated with the gestures based on a filtered version of the derivative of the first signal 414 — Assign a different label to data associated with each of the gestures and data corresponding to the motion epochs associated with each of the gestures 416 — Train a gesture prediction model based on a plurality of second signals and labeled data associated with each of the gestures corresponding to the first signal

FIG. 4

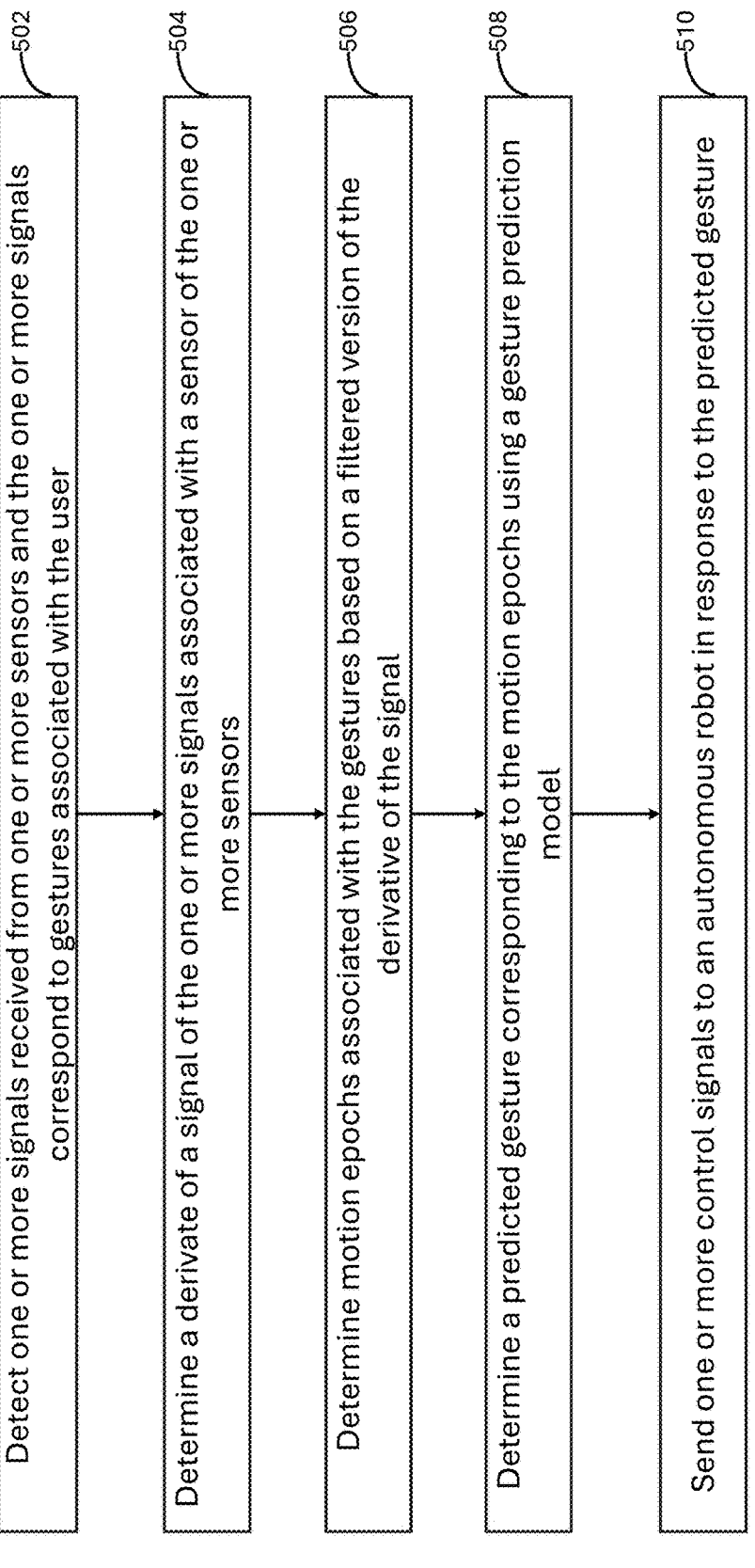

502 Detect one or more signals received from one or more sensors and the one or more signals correspond to gestures associated with the user 504 Determine a derivate of a signal of the one or more signals associated with a sensor of the one or more sensors 506 Determine motion epochs associated with the gestures based on a filtered version of the derivative of the signal 508 Determine a predicted gesture corresponding to the motion epochs using a gesture prediction model 510 Send one or more control signals to an autonomous robot in response to the predicted gesture

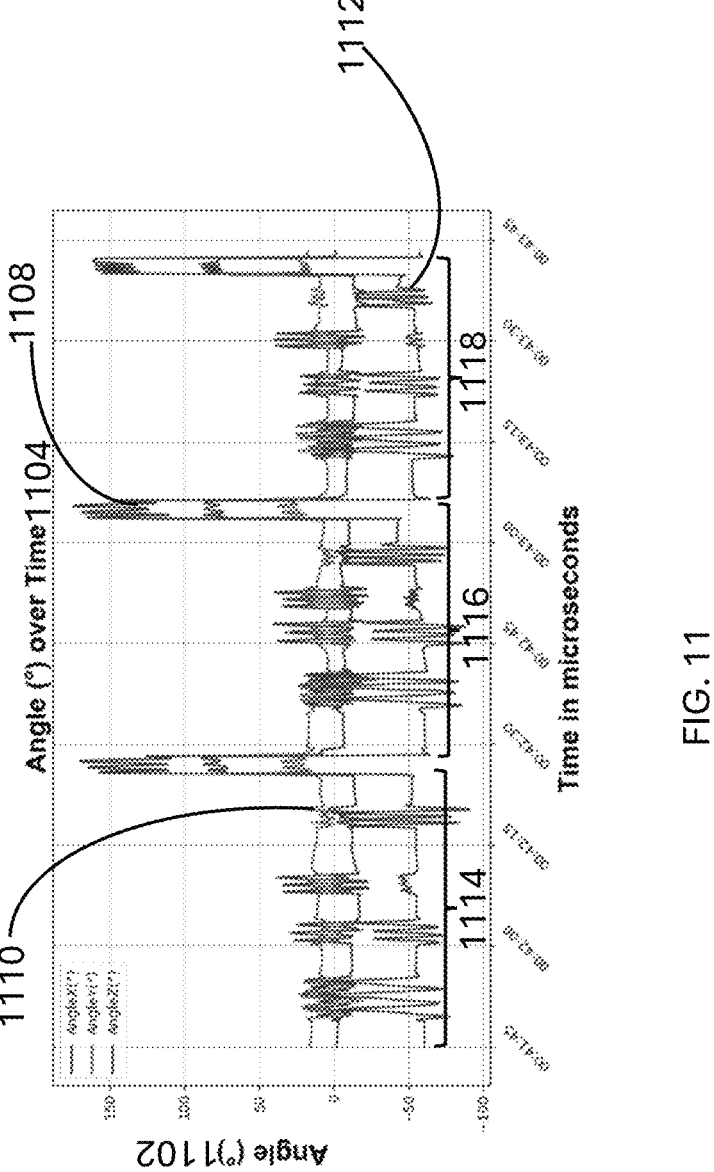
FIG. 11
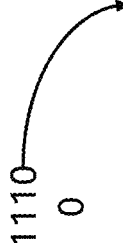

Original Signal1302

Low-pass Filtering: Moving Average1304

Low-pass Filtering: Butterworth Filter1306

Low-pass Filtering: Gaussian Filter1308

1300

INTEGRATED COMMUNICATION KIT FOR AUTONOMOUS ROBOTS

FIELD OF THE INVENTION

The present disclosure generally relates to a wearable device that tracks a user's gesture and encodes those gestures as commands to control an autonomous robot.

BACKGROUND

Autonomous robots play an important role on the battlefield. Troops depend on autonomous robots for reconnaissance, directing operations, and ground attacks. Military campaigns are increasingly more reliant on the ability to successfully control, and maneuver organized groups of autonomous robots using swarm tactics. Autonomous robot operations are conducted with a handheld remote-control device, which is oftentimes expensive. Thus, there is a need to lower the cost of the components of autonomous robot remote-control devices for operations and for general military communications. The nature of a remote-control device of an autonomous robot is not ergonomic, especially because of the large form factor. A lower cost smaller form factor remote-control device is desirable.

SUMMARY OF INVENTION

The instant application includes disclosures about wearable remote-control apparatuses configured to control an autonomous robot. The apparatuses comprise one or more sensors configured to detect motion of the wearable remote apparatus. The disclosed apparatuses further comprise a memory storing computer readable instructions corresponding to commands to control the autonomous robot. The computer readable instructions can comprise a gesture prediction module instructions and encoding module instructions. The wearable remote-control apparatuses can comprise at least one processor configured to execute one or more computer executable instructions to detect one or more signals received from the one or more sensors wherein the one or more signals correspond to gestures associated with a user. The one or more computer executable instructions can further configure the at least one processor to determine a derivate of a signal of the one or more signals associated with a sensor of the one or more sensors. The one or more computer executable instructions can further configure the at least one processor to determine a motion epoch associated with the gestures based on a filtered version of the derivative of the signal. The one or more computer executable instructions can further configure the at least one processor to determine a predicted gesture corresponding to the motion epoch using a gesture prediction model. The one or more computer executable instructions can further configure the at least one processor to send one or more control signals to an autonomous robot in response to the predicted gesture.

The instant disclosure further comprises methods for controlling an autonomous robot. The methods can comprise detecting one or more signals received from one or more sensors on a user, wherein the one or more signals correspond to gestures associated with the user. The methods can further comprise determining a derivate of a signal of the one or more signals associated with a sensor of the one or more sensors. The methods can further comprise determining a motion epoch associated with the gestures based on a filtered version of the derivative of the signal, methods can further comprise determining a predicted gesture corresponding to the motion epoch using a gesture prediction model. The methods can further comprise sending one or more control signals to an autonomous robot in response to the predicted gesture.

The instant disclosure further comprises systems for controlling an autonomous robot. The systems can comprise the autonomous robot, a wearable device on a user comprising one or more sensors embedded in the wearable device, at least one memory storing instructions for detecting one or more gestures, and at least one processor configured to execute the instructions thereby causing the at least one processor to detect one or more signals received from the one or more sensors wherein the one or more signals correspond to gestures associated with a user. The instructions can further configure the at least one processor to determine a derivate of a signal of the one or more signals associated with a sensor of the one or more sensors. The instructions can further configure the at least one processor to determine a motion epoch associated with the gestures based on a filtered version of the derivative of the signal. The instructions can further configure the at least one processor to determine a predicted gesture corresponding to the motion epoch using a gesture prediction model. The instructions can further configure the at least one processor to send one or more control signals to an autonomous robot in response to the predicted gesture.

BRIEF DESCRIPTION OF THE DRAWINGS

In order that the present disclosure may be readily understood, aspects of the disclosed wearable device are illustrated by way of examples in the accompanying drawings, in which like parts are referred to with like reference numerals throughout.

FIG. 4 is an exemplary flowchart for training a machine learning model to predict a command gesture of a user to control the autonomous robot according to various aspects of the disclosure.

FIG. 5 is an exemplary flowchart for predicting a command gesture of a user to control the autonomous robot according to various aspects of the disclosure.

FIG. 11 is a plot of an angle of the wearable device along each axis of a cartesian coordinate system in response to a gesture of a user wearing the wearable device according to various aspects of the disclosure.

DETAILED DESCRIPTION

Figure 1:
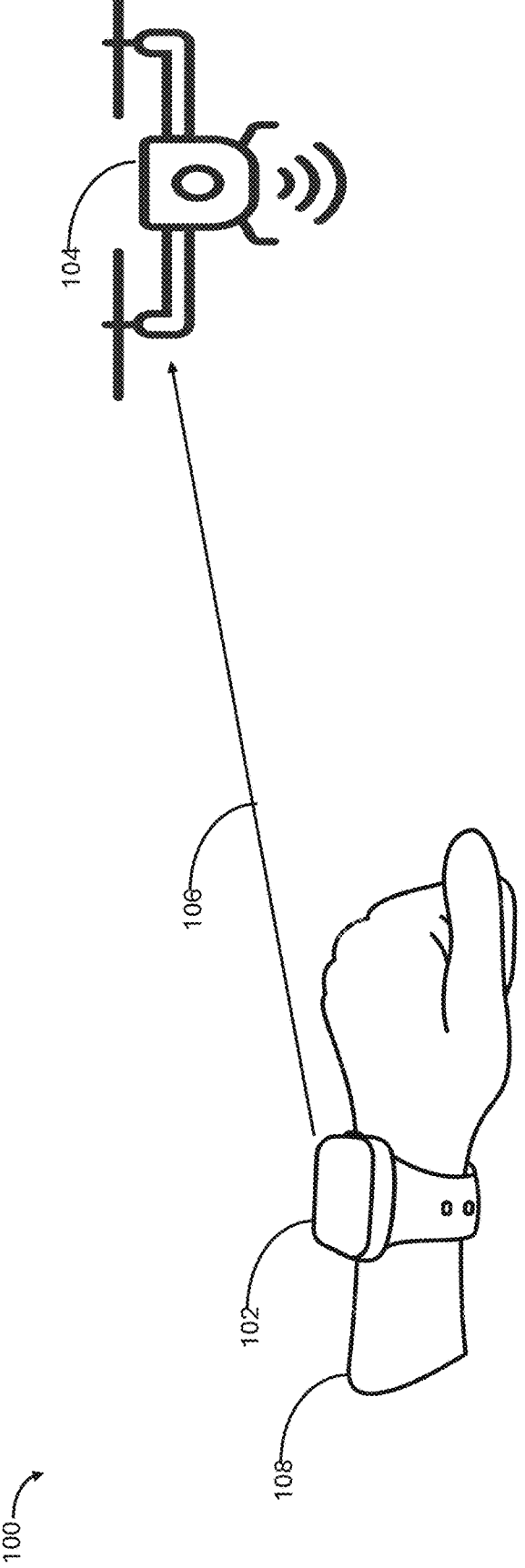
FIG. 1 is an exemplary network formed between a wearable device and an autonomous robot according to various aspects of the disclosure.

The following description of the embodiments is merely exemplary in nature and is not intended to limit the subject matter of the present disclosure, there application, or uses.

It is noted that, as used in this specification and the appended claims, the singular forms "a," "an," and "the," include plural references unless expressly and unequivocally limited to one referent. As used herein, the term "include" and its grammatical variants are intended to be non-limiting, such that recitation of items in a list is not to the exclusion of other like items that can be substituted or added to the listed items. For example, as used in this specification and the following claims, the terms "comprise" (as well as forms, derivatives, or variations thereof, such as "comprising" and "comprises"), "include" (as well as forms, derivatives, or variations thereof, such as "including" and "includes") and "has" (as well as forms, derivatives, or variations thereof, such as "having" and "have") are inclusive (i.e., open-ended) and do not exclude additional elements or steps. Accordingly, these terms are intended to not only cover the recited element(s) or step(s), but may also include other elements or steps not expressly recited. Furthermore, as used herein, the use of the terms "a" or "an" when used in conjunction with an element may mean "one," but it is also consistent with the meaning of "one or more," "at least one," and "one or more than one." Therefore, an element preceded by "a" or "an" does not, without more constraints, preclude the existence of additional identical elements.

The instant disclosure is directed to a wristband with a collection of sensors that are programmed to detect specific hand gestures. The hand gestures can encode actions corresponding to the control of an autonomous robot by communicating with a flight control device in the autonomous robot. The wristband is comfortable to wear and allows the user to use their hands for other tasks.

The wearable device can serve as a proof of concept for drone operations in commercial applications, but can be used for any military communication that would benefit from freeing the hands and delivering undisclosed direction at a low cost.

The wearable device can encode five specific gestures as five distinguishable signals. The gestures that are selected are distinguishable and not easily misinterpreted as another gesture. The disclosed wearable device enables a user to select at least five distinguishable gestures based on their preference. A machine learning module is also disclosed that is configured to learn the gestures during a training phase. The wearable device can be configured to recognize the gestures based on the trained machine learning module and encode the recognized gestures as signals that are sent to the autonomous robot with instructions to control the autonomous robot.

In some embodiments, the gestures can correspond to different control signals that control actions of the autonomous robot. There can be a gesture associated with each of the following control signals of follow-me, stationary hover, land, on, and off.

In some embodiments, the autonomous robot can be a drone that is used when skiers or snowboarders are filming themselves as they traverse the terrain of a mountain. The skier or snowboarder can perform certain gestures before their descent down the mountain that are recognized by the wearable device and signals and corresponding to the gestures can be sent to the drone that cause the drone to fly alongside the skier or snowboarder. In some embodiments, the signals can include instructions that cause the drone to fly in certain patterns around the skier or snowboarder so that footage of the skier or snowboarder is taken as they traverse the mountain.

In another snow related setting, ski patrol could use the wearable device to control a snowmobile, autonomously, to traverse parts of a mountain that could prove to be dangerous to the operator of the snowmobile.

Yet in another embodiment, astronauts could use the a similar wearable device while in space to control autonomous robots or vehicles from a distance.

FIG. 1 is an exemplary network 100 depicting a communication link 106 between a wearable device 102 worn by a user 108 and an autonomous robot 104. While the communication link 106 is depicted as showing communication from the wearable device 102 to the autonomous robot 104, the autonomous robot 104 can send signals to the wearable device 102 in situations in which there might be a malfunctioning component of the autonomous robot 104 or the autonomous robot 104 provides feedback to the user about the conditions that the autonomous robot 104 is operating in.

When the user 108 performs a gesture corresponding to a command that can be recognized by the autonomous robot 104, a processor in the wearable device 102 can execute a gesture prediction module stored in a memory of the wearable device 102, to determine what gesture the user has performed. The input to the gesture prediction module can be data generated by an accelerometer, gyroscope, or magnetometer or other sensor. The accelerometer data can be the magnitude of an accelerometer signal corresponding to the wearable device that is produced by the accelerometer over a period of time in response to the gesture performed by the user. Gyroscope data can include the angular velocity of the wearable device and angle of the wearable device over the same period of time that the accelerometer data is collected. The magnetometer can generate data measuring the magnetic field detected by the magnetometer as the wearable device is moved in response to the user performing the gesture. The accelerometer data, gyroscope data, and magnetometer data include measurements along each axis of the cartesian coordinate system.

Figure 2:
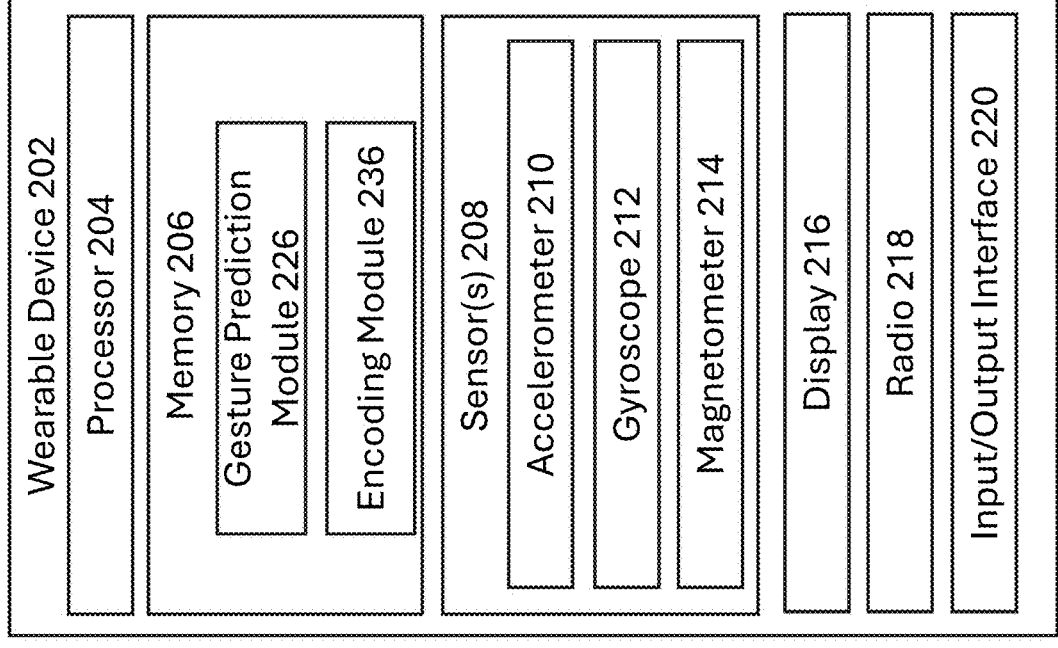
FIG. 2 is an exemplary computing environment, in block diagram form, of a wearable device used to interface with the autonomous robot according to various aspects of the disclosure.

The wearable device can include one or more computing components as shown in FIG. 2. A wearable device 202 can include a processor 204, memory 206, sensor(s) 208, a display 216, radio 218, and input/output interface 220. The memory 206 can store a gesture prediction module 226 including instructions that when executed by the processor 204 cause the processor to detect a gesture performed by the user. The memory 206 can further include an encoding module 236 that encodes a predicted gesture by the user into a control signal that can be recognized by the autonomous robot 104. The processor 204 can send instructions to a radio 218 with the control signal corresponding to encoded predicted gesture, and the radio 218 can transmit the control signal to the autonomous robot 104.

Figure 3B:
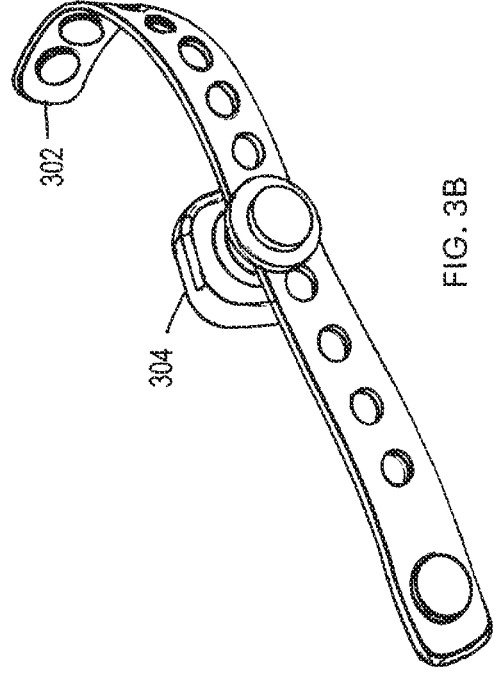
FIG. 3B is a bottom side of an exemplary wearable device used to interface with the autonomous robot according to various aspects of the disclosure.
Figure 3A:
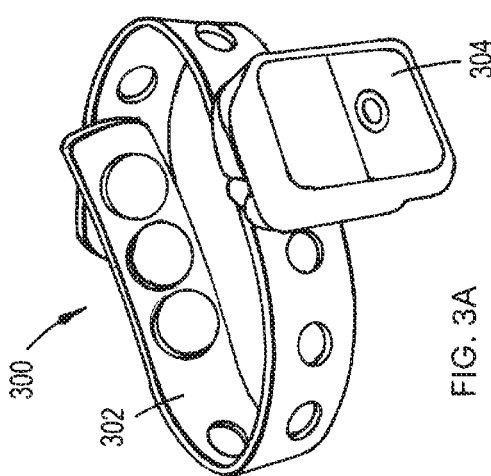
FIG. 3A is a top side of an exemplary wearable device used to interface with the autonomous robot according to various aspects of the disclosure.

FIG. 3A depicts a front facing view of a wristband 302 attached to a motion detection device 304. The combination of the wristband 302 and motion detection device 304 form a wearable device 300. FIG. 3B depicts the underside of the wristband 302 and motion detection device 304.

FIG. 4 is a flowchart of a process 400 for training a machine learning module to predict gestures performed by a user. At step 402, the process can determine that a remote-control device (wearable device) is in contact with a user's body. At step 404, the process can initialize one or more sensors associated with the remote-control device in response to the determination that the remote-control device is in contact with the user's body. At step 406, the process 400, can synchronize the one or more sensors. At step 408, the process 400, can detect one or more signals received from the one or more sensors wherein the one or more signals corresponding to the gestures associated with the user. At step 410, the process 400, can determine a derivate of a first signal of the one or more signals associated with a first sensor of the one or more sensors. In some embodiments, the first signal can be preprocessed by determining a magnitude of the first signal followed by smoothing of the magnitude of the first signal including methods such as Kalman filtering, interpolation, Savitzky-Golay filtering, wavelet denoising, moving average low-pass filtering, Butterworth low-pass filtering, or Gaussian low-pass filtering. The magnitude of the first signal can be expressed as:

$$\text{Magnitude}_{ACC} = \sqrt{Acc_x^2 + Acc_y^2 + Acc_z^2}.$$

In this instance the first signal can correspond to the acceleration data generated by the accelerometer. The magnitude of the acceleration is equal to the square root of the sum of the squared values of the acceleration of the wearable device along each axis of the cartesian coordinate system. Motion of the wearable device is then determined based on a derivative of the magnitude of acceleration of the wearable device along each of the axes satisfying a certain threshold value.

After motion has been detected, the process 400 can then determine motion epochs associated with the gestures based on a filtered version of the derivate of the first signal at step 412. The process 400 can then assign a different label to data associated with each of the gestures and data corresponding to the motion epochs associated with each of the gestures at step 414. The process 400 can train a gesture prediction model based on a plurality of second signals collected by sensor in the motion detection device and the labeled data associated with each of the gestures corresponding to the first signal at step 416.

FIG. 5 is a process 500 of determining a gesture performed by a user and sending a control signal to the autonomous robot 104 in response to the determined gesture. At step 502, the process 500 can detect one or more signal received from one or more sensors and the one or more signals correspond to gestures associated with the user. At step 504, the process 500, can determine a derivative of a signal of the one or more signals associated with a sensor of the one or more sensors. At step 506, the process 500 can determine motion epochs associated with the gestures based on a filtered version of the derivative of the signal. At step 508, the process 500 can determine a predicted gesture corresponding to the motion epochs using a gesture prediction model. At step 510, the process can send one or more control signals to an autonomous robot in response to the predicted gesture.

In some embodiments, five gestures were determined to be easily distinguishable from one another. The first gesture corresponds to an infinity symbol. The second gesture corresponds to a counterclockwise circle. The third gesture corresponds to an up and down motion. The fourth gesture corresponds to a come hither motion. And the fifth gesture corresponds to a wrist flexion pivoting hand from left to right about a wrist axis. In some embodiments, each motion detected by the wearable device might need to be performed three times in a row to produce a single recognizable gesture.

Figure 6:
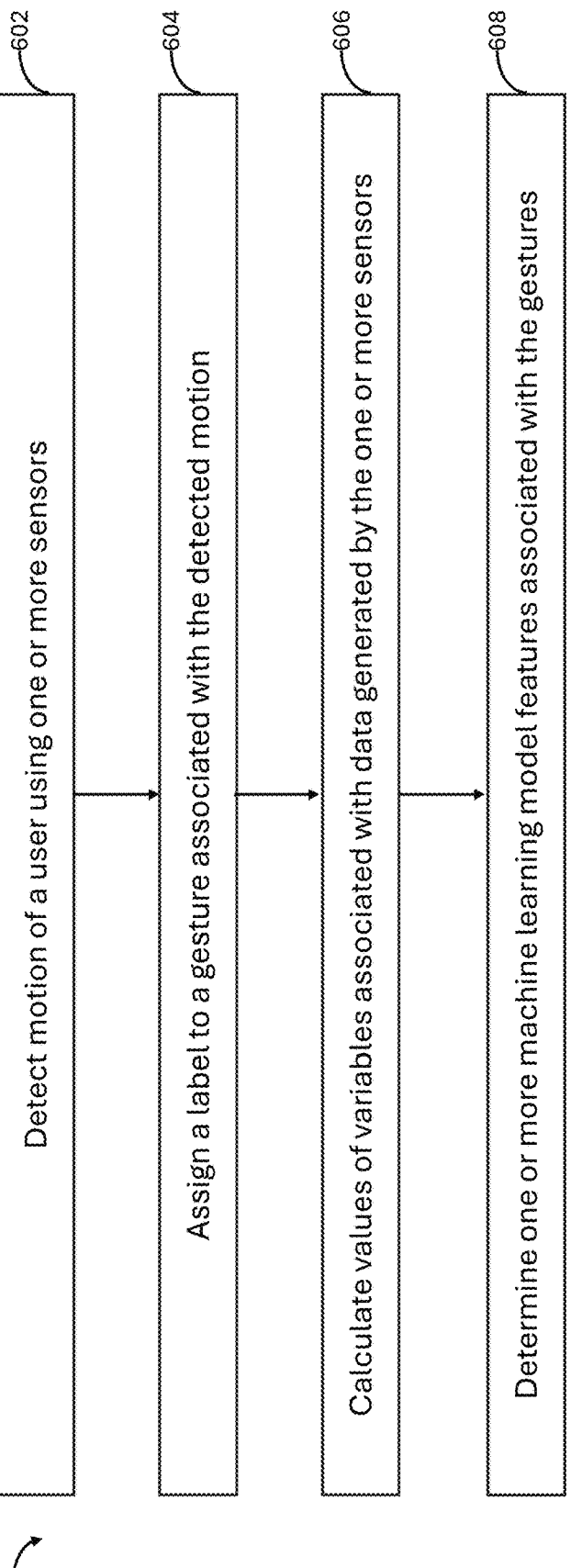
FIG. 6 is an exemplary flowchart for determining machine learning model features associated with a gesture of user to control the autonomous robot according to various aspects of the disclosure.

FIG. 6 is an exemplary flowchart of a process 600 for determining machine learning model features associated with a gesture of user to control the autonomous robot according to various aspects of the disclosure. At step 602, the process 600 can detect motion of a user using one or more sensors attached to the user. The motion can be determined by defining epochs of performing a gesture versus periods in between gestures. A magnitude associated with the acceleration of motion of the one or more sensors can be denoised using a gaussian low-pass filter, normalized and centered. Then the derivative of the denoised, normalized, and centered magnitude can be computed. Motion can be defined by a threshold in the absolute value of the derivative of the denoised, normalized and centered magnitude of acceleration. When the absolute value of the magnitude is above the threshold level the epoch is labeled as a motion epoch. This method accurately distinguishes motion epochs when a gesture is being performed.

Figure 8:
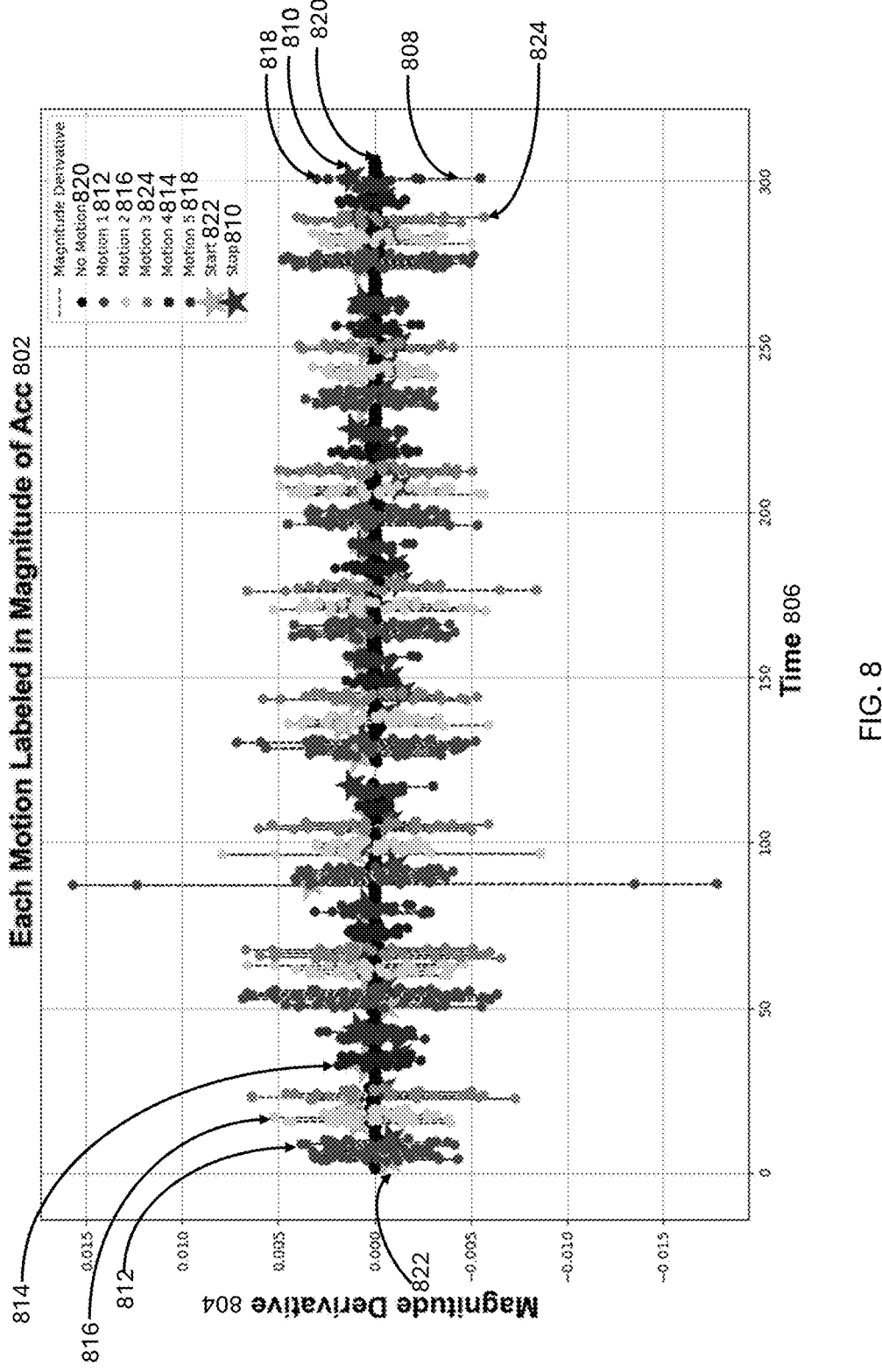
FIG. 8 is an exemplary plot of labeled motions corresponding to a magnitude of the acceleration associated with motion of the user controlling the autonomous robot according to various aspects of the disclosure.

At step 604, the process 600 can assign a label to a gesture associated with the detected motion. As an example, and as shown in FIG. 8, there can be a plurality of gestures each of which is associated with a different label. At step 606, the process 600 can calculate values of variables associated with data generated by the one or more sensors. The variables associated with the data generated by the one or more sensors can include acceleration of a user's limb in the X, Y, and Z axes, the angle around the X, Y, and Z axes, the angular velocity around the X, Y, and Z axes, the magnetic field along the X, Y, and Z axes, and quaternion rotation variables. The quaternion rotation variables can be a way to represent 3D rotations compactly and without gimbal lock, and it consists of four components:

$$q = q0 + q1i + q2j + q3k,$$

$$q0 = \cos\left(\frac{\theta}{2}\right),$$

$$q1 = x * \sin\left(\frac{\theta}{2}\right),$$

$$q2 = y * \sin\left(\frac{\theta}{2}\right), \text{ and}$$

$$q3 = z * \sin\left(\frac{\theta}{2}\right).$$

As noted above the magnitude of acceleration, angle, angular velocity, and magnetic field are included, low-pass filters including the Butterworth Filter and Gaussian Filter can be used. These filters can be applied to the acceleration, angle, and angular velocity magnitude. A Hilbert Transform can also be used to obtain instantaneous phase and amplitude envelope for acceleration, angle, and angular velocity magnitude. Smoothing methods can also be applied including moving average and the Savitzky-Golay. The Savitzky-Golay filter fits a low-degree polynomial to a moving window of data using least squares and replacing the center point in the window with the value of the fitted polynomial. The Savitzky-Golay filter preserves features like peak height and width, unlike a simple moving average. Filter which were applied to acceleration, angle, and angular velocity magnitude. Wavelet denoising can also be applied to acceleration, angle, and angular velocity magnitude.

At step 608, the process 600 can determine one or more machine learning model features associated with each of the gestures. Various feature selection approaches can be compared to determine the optimal set of features to include in the machine learning model. Methods of feature selection can include a polynomial feature transformer from the Python module sklearn and down-selection of features by either principal component analysis or Random Forest classification feature importances. The importance of a feature is calculated as the total reduction in Gini impurity it contributes across all trees. Then, for each gesture a new set of features is defined using the available data. The available data can include Time-domain features and Frequency-domain features. The Time-domain features can include Mean Standard deviation, Minimum, Maximum, Range (max-min), Median, 25th percentile, 75th percentile, Mean of first-order differences, Std of first-order differences, Mean of second-order differences, Std of second-order differences.

The Frequency-domain features can include Dominant frequency, Spectral centroid, Spectral bandwidth, and Spectral entropy. The mean value of first-order differences is the average rate of change or the average of the first derivative. The mean of second-order differences is the average of the second derivative or the rate of change of the slope. The real-valued Fast Fourier Transform of the signal transforms the signal from the time domain to the frequency domain and is used to define the Frequency-domain features.

The one or more sensor data that is collected can be split into 80% training data and 20% testing data. A training data subset is fed to an ensemble of four models: Random Forest Classifier, the Neural Network MLP Classifier, the Bagging Classifier, and Gradient Boosting Classifier. GridSearchCV from the scikit-learn Python module is used to define optimal parameters and cross-validation folds for the models. Accuracy is defined using the testing data subset. Final model accuracy is 0.999.

Figure 7:
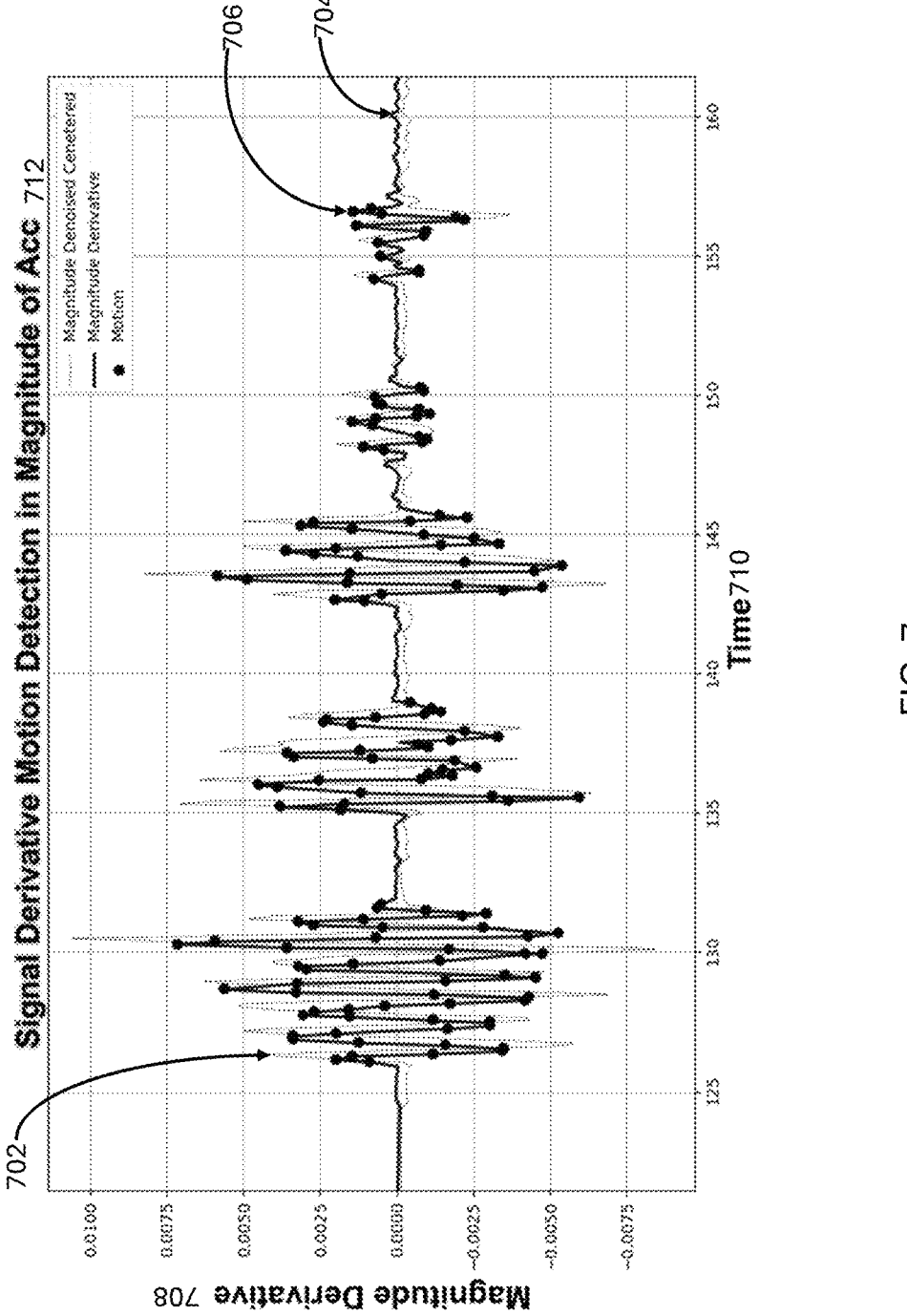
FIG. 7 is a plot of a derivative of a magnitude of the acceleration associated with motion of the user controlling the autonomous robot according to various aspects of the disclosure.

FIG. 7 is a plot of a derivative of a magnitude of the acceleration associated with motion of the user controlling the autonomous robot according to various aspects of the disclosure. Plot 700 illustrates a relationship between a magnitude of a derivative of acceleration data obtained by the one or more sensors. Data associated with a magnitude derivative 708 is plotted against time 710. The magnitude derivative 704 is the plot of the acceleration data obtained from the one or more sensors over a period of time. Motion 706 corresponds to data associated with a detection of motion at a given time. Magnitude denoised centered 702 corresponds to a denoised and centered magnitude derivative.

FIG. 8 is an exemplary plot of labeled motions corresponding to a magnitude of the acceleration associated with motion of the user controlling the autonomous robot according to various aspects of the disclosure. Plot 800 includes a magnitude derivative 804 expressed as a function of time 806. Magnitude derivative 808 corresponds to a magnitude of a derivative of the acceleration data, start 822 corresponds to a beginning of an epoch, and stop 810 corresponds to an end of an epoch. Motion 1 812, motion 2 816, motion 3, 824, motion 4 814, and motion 5 818 each correspond to different unique features performed by a user that can translate into different commands to control the autonomous robot.

Figure 9:
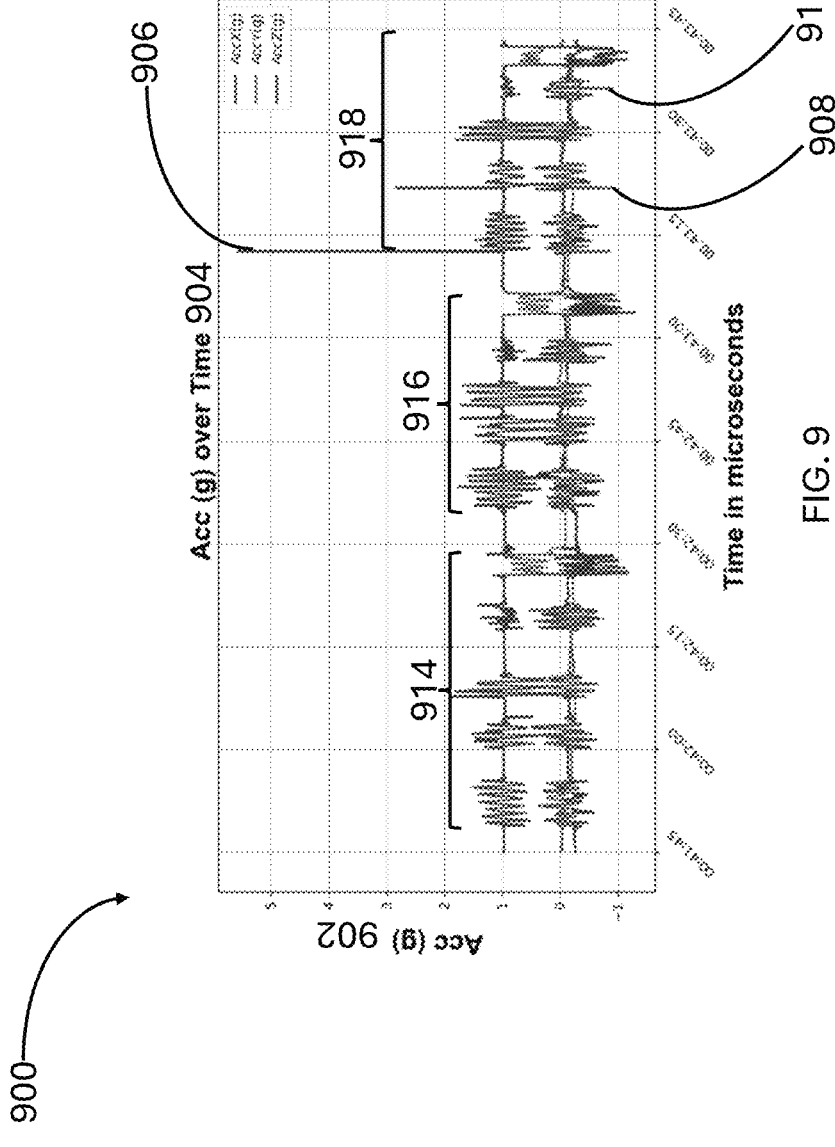
FIG. 9 is a plot of an acceleration of the wearable device along each axis of a cartesian coordinate system in response to a gesture of a user wearing the wearable device according to various aspects of the disclosure.

FIG. 9 shows an amplitude Acc(g) 902 output by the accelerometer Acc(g) over Time 904 along all three axes of the cartesian coordinate system. In particular, accelerometer amplitude 906 corresponds to acceleration along the z-axis, accelerometer amplitude 908 corresponds to acceleration along the y-axis, and accelerometer amplitude 912 corresponds to acceleration along the x-axis. Sequence 914 corresponds to accelerometer amplitude measurements corresponding to five gestures performed by the user in a first time period, sequence 916 corresponds to five accelerometer amplitude measurements corresponding to five gestures performed by the user in a second time period, sequence 918 corresponds to five accelerometer amplitude measurements corresponding to five gestures performed by the user in a third time period. Each gesture can be separated by a 1 second pause.

Figure 10:
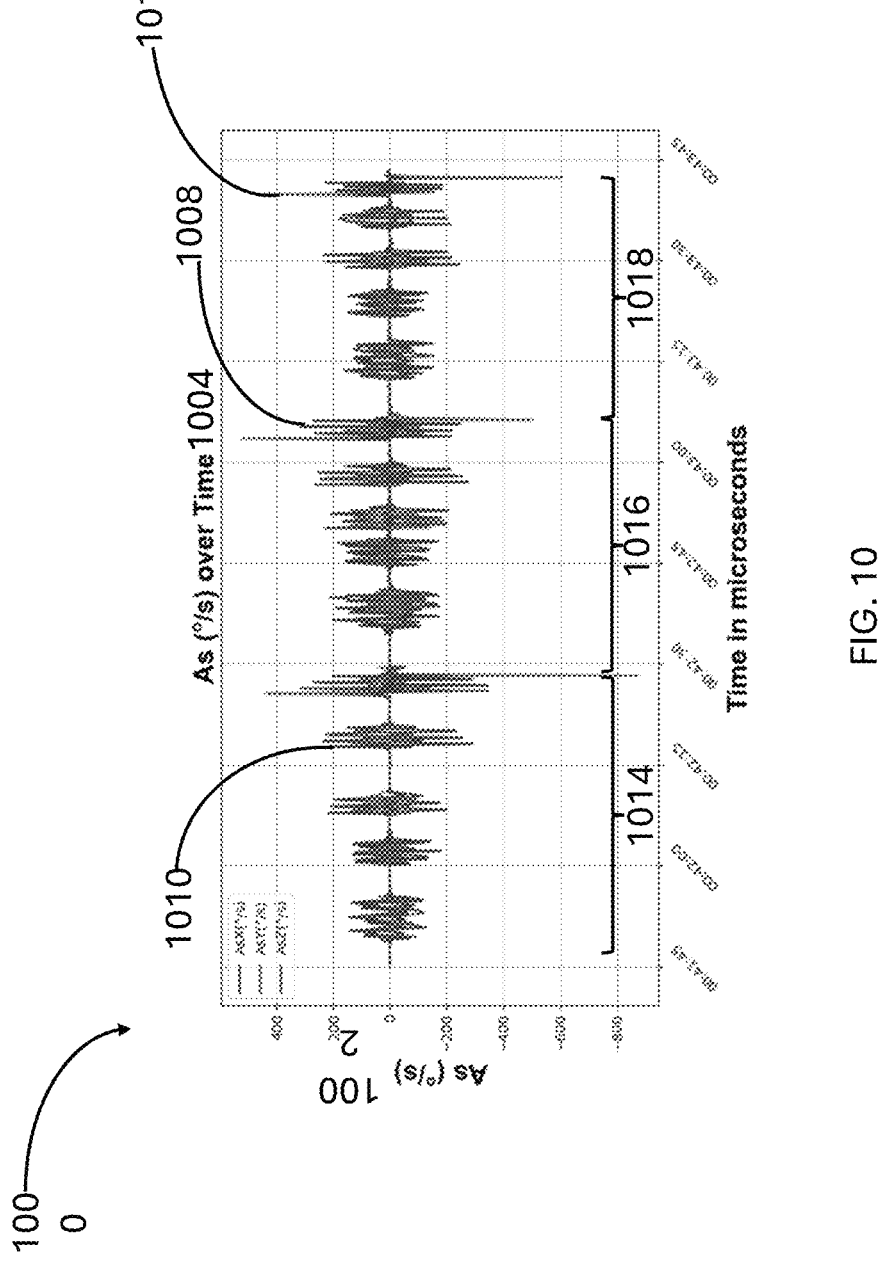
FIG. 10 is a plot of an angular velocity of the wearable device along each axis of a cartesian coordinate system in response to a gesture of a user wearing the wearable device according to various aspects of the disclosure.

FIG. 10 shows an angular velocity As(°/s) 1002 output by the gyroscope As(°/s) over Time 1004 along all three axes of the cartesian coordinate system. In particular, angular velocity 1010 corresponds to acceleration along the z-axis, angular velocity 1012 corresponds to acceleration along the y-axis, and angular velocity 1008 corresponds to acceleration along the x-axis. Sequence 1014 corresponds to five angular velocity measurements corresponding to five gestures performed by the user in a first time period, sequence 1016 corresponds to five angular velocity measurements corresponding to five gestures performed by the user in a second time period, sequence 1018 corresponds to five angular velocity measurements corresponding to five gestures performed by the user in a third time period. Each gesture can be separated by a 1 second pause.

FIG. 11 shows an Angle (°) 1102 output by the gyroscope Angle (°) over Time 1104 along all three axes of the cartesian coordinate system. In particular, angle 1112 corresponds to an angle along the z-axis, angle 1110 corresponds to an angle along the y-axis, and angle 1108 corresponds to an angle along the x-axis. Sequence 1114 corresponds to five gestures performed by the user in a first time period, sequence 1116 corresponds to five gestures performed by the user in a second time period, sequence 1118 corresponds to five gestures performed by the user in a third time period. Each gesture can be separated by a 1 second pause.

Figure 12:
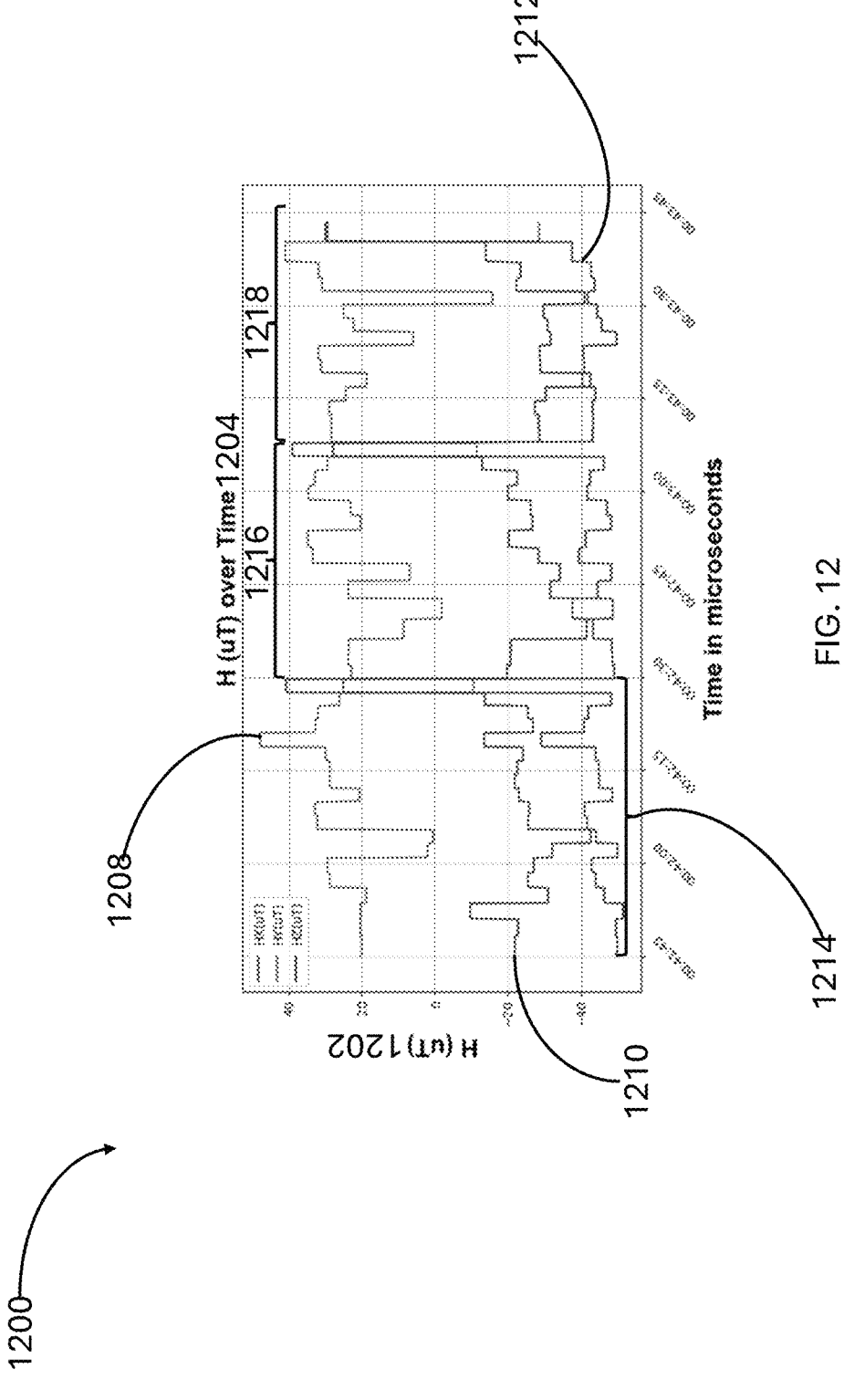
FIG. 12 is a plot of a magnetic field of the wearable device along each axis of a cartesian coordinate system in response to a gesture of a user wearing the wearable device according to various aspects of the disclosure.

FIG. 12 shows a magnetic field measurement H (uT) 1202 output by the magnetometer H (uT) over Time 1204 along all three axes of the cartesian coordinate system. In particular, magnetic field measurement 1212 corresponds to a magnetic field measurement along the z-axis, magnetic field measurement 1208 corresponds to an angle along the y-axis, and magnetic field measurement 1210 corresponds to a magnetic field measurement along the x-axis. Sequence 1214 corresponds to five magnetic field measurements corresponding to five gestures performed by the user in a first time period, sequence 1216 corresponds to five magnetic field measurements corresponding to five gestures performed by the user in a second time period, sequence 1218 corresponds to five magnetic field measurements corresponding to five gestures performed by the user in a third time period. Each gesture can be separated by a 1 second pause.

Figures 13A, 13B, 13C, 13D:
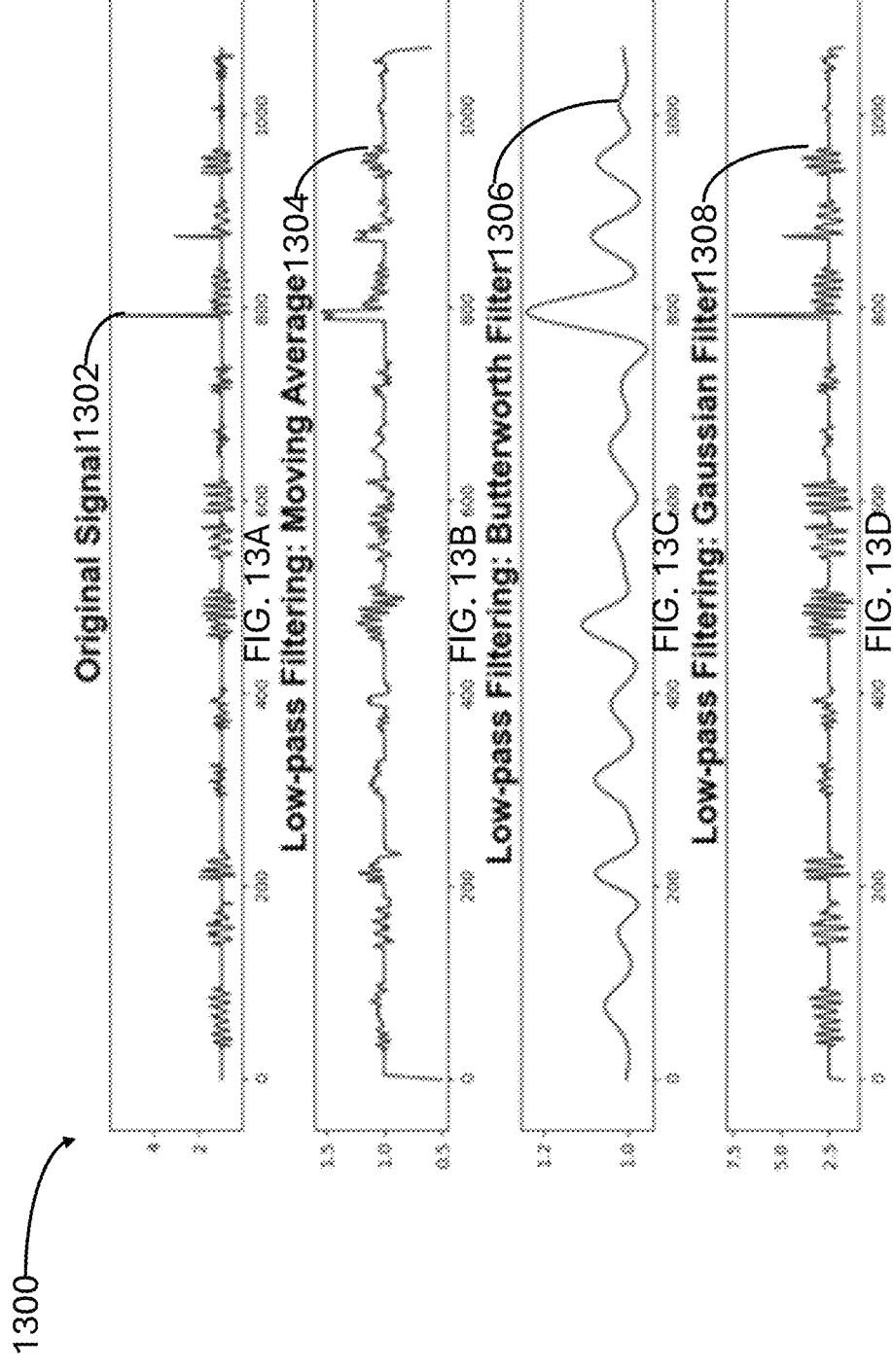
FIG. 13A is a plot of a magnitude of an output signal from an accelerometer of the wearable device in response to a gesture performed by a user according to various aspects of the disclosure.
FIG. 13B is a plot of the magnitude of the output signal from the accelerometer of the wearable device that has been low-pass filtered using a moving average according to various aspects of the disclosure.
FIG. 13C is a plot of the magnitude of the output signal from the accelerometer of the wearable device that has been low-pass filtered using a butterworth filter according to various aspects of the disclosure.
FIG. 13D is a plot of the magnitude of the output signal from the accelerometer of the wearable device that has been low-pass filtered using a Gaussian filter according to various aspects of the disclosure.

FIG. 13A shows the magnitude of the output of accelerometer of an original signal 1302. The original signal 1302 can be the magnitude of the output of the accelerometer as described above. FIG. 13B shows a moving average low-pass filter version 1304 of the magnitude of the output of the accelerometer. FIG. 13C shows a Butterworth low-pass filter version 1306 of the magnitude of the output of the accelerometer. FIG. 13D shows a Gaussian low-pass filter version 1308 of the magnitude of the output of the accelerometer.

Figure 14:
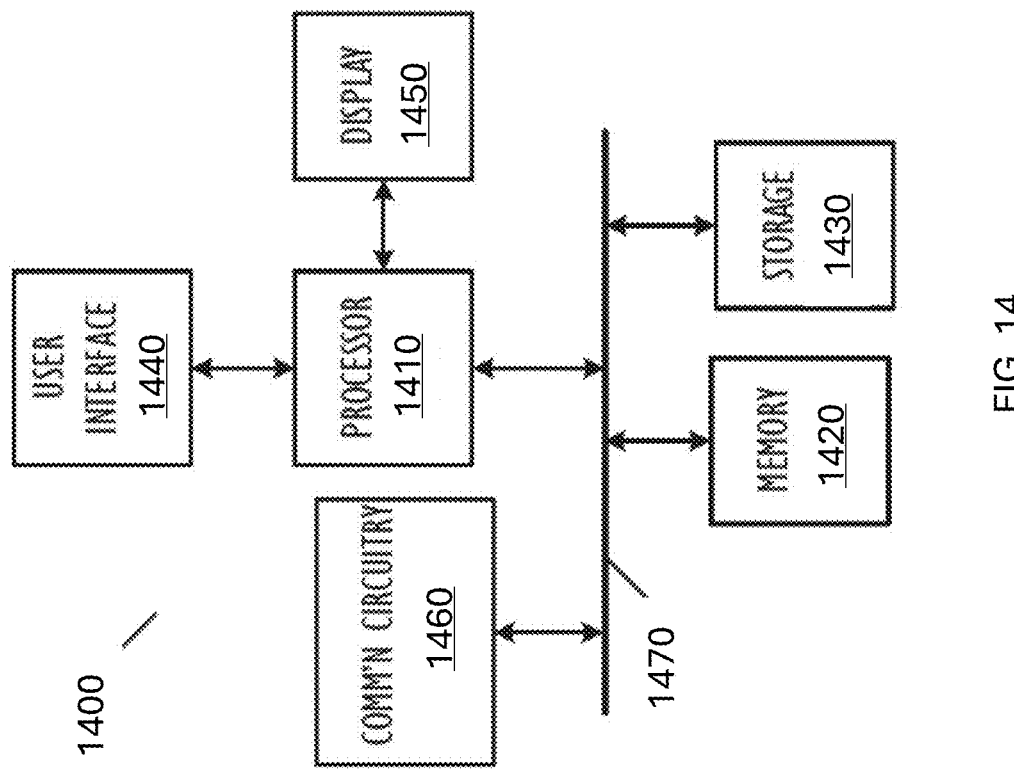
FIG. 14 shows, in block diagram form, a network diagram of a portion of the wearable device, according to one or more embodiments.

Referring now to FIG. 14, a simplified functional block diagram of an illustrative multifunctional electronic device 1400 for use in the wearable device 102, according to various aspects of the disclosure, is shown. Multifunction electronic device 1400 may include processor 1410, memory 1420, storage device 1430, user interface 1440, display 1450, communications circuitry 1460, and communications bus 1470. Multifunction electronic device 1400 may be, for example, a personal electronic device such as a personal digital assistant (PDA), mobile telephone, or a tablet computer.

Processor 1410 may execute instructions necessary to carry out or control the operation of many functions performed by device 1400. Processor 1410 may, for instance, drive display 1450 and receive user input from user interface 1440. User interface 1440 may allow a user to interact with device 1400. For example, user interface 1440 can take a variety of forms, such as a button, keypad, dial, a click wheel, keyboard, display screen and/or a touch screen. Processor 1410 may also, for example, be a system-on-chip such as those found in mobile devices and include a dedicated graphics processing unit (GPU). Processor 1410 may be based on reduced instruction-set computer (RISC) or complex instruction-set computer (CISC) architectures or any other suitable architecture and may include one or more processing cores.

Memory 1420 may include one or more different types of media used by processor 1410 to perform device functions. For example, memory 1420 may include memory cache, read-only memory (ROM), and/or random-access memory (RAM). Storage 1430 may store media (e.g., audio, image and video files), computer program instructions or software, preference information, device profile information, and any other suitable data. Storage 1430 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 1420 and storage 1430 may be used to tangibly retain computer program instructions or code organized into one or more modules and written in any desired computer programming language. When executed by, for example, processor 1410 such computer program code may implement one or more of the methods described herein.

Storage system 1430 could, for example, be used to store multi-media items or links to other input, output, or intermediate processing-, storage-, backup- or recovery-related data referenced herein. Data includes application software, configuration, and licensing; application instance and configuration information; analyst configuration and preferences; user, client, and project information, libraries and templates; computational models and ratings; archival storage and backup/recovery information; system resiliency and redundancy information; storage and networking sources and data whether standalone, local, remote, or cloud networked; and metadata and meta-metadata about the aforementioned information.

While certain implementations have been described in terms of what may be considered to be specific aspects, the present disclosure is not limited to the disclosed aspects. Additional modifications and improvements to the aforementioned vial adapter may be apparent to those skilled in the art. Moreover, the many features and advantages of the disclosure are apparent from the detailed specification, and thus, it is intended by the appended claims to cover all such features and advantages of the present disclosure which fall within the spirit and scope of the disclosure.

What is claimed is:

1. A wearable remote-control apparatus comprising:
   one or more sensors configured to detect motion of the wearable remote-control apparatus;
   a memory storing computer readable instructions, the computer readable instructions comprising:
   gesture prediction module instructions, and
   encoding the gesture prediction module instructions; and
   at least one processor configured to execute one or more computer executable instructions to:
   detect one or more signals received from the one or more sensors wherein the one or more signals correspond to gestures associated with a user;
   determine a derivative of a magnitude of acceleration of a signal of the one or more signals associated with a sensor of the one or more sensors, wherein the magnitude of acceleration is based on an output of an accelerometer on each axis of a cartesian coordinate system;
   determine a motion epoch associated with the gestures based on a filtered version of the derivative of the signal;
   determine a predicted gesture corresponding to the motion epoch using a gesture prediction model; and
   send one or more control signals to an autonomous robot in response to the predicted gesture, wherein the control signals are configured to cause the autonomous robot to perform physical movements.

2. The wearable remote-control apparatus of claim 1, wherein the one or more sensors comprise a gyroscope, and magnetometer.

3. The wearable remote-control apparatus of claim 2, wherein the signal is an accelerometer signal generated by the accelerometer.

4. The wearable remote-control apparatus of claim 1, wherein the gestures comprise a plurality of motion epochs.

5. The wearable remote-control apparatus of claim 1, wherein the filtered version of the derivative of the signal is an output of a Gaussian low pass filter.

6. A method controlling an autonomous robot, the method comprising:

detecting one or more signals received from one or more sensors on a user, wherein the one or more signals correspond to gestures associated with the user;

determining a derivative of a magnitude of acceleration of a signal of the one or more signals associated with a sensor of the one or more sensors, wherein the magnitude of acceleration is based on an output of an accelerometer on each axis of a cartesian coordinate system;

determining a motion epoch associated with the gestures based on a filtered version of the derivative of the signal;

determining a predicted gesture corresponding to the motion epoch using a gesture prediction model; and sending one or more control signals to the autonomous robot in response to the predicted gesture, wherein the control signals are configured to cause the autonomous robot to perform physical movements.

7. The method of claim 6, wherein the one or more sensors comprise a gyroscope, and magnetometer.

8. The method of claim 7, wherein the signal is an accelerometer signal generated by the accelerometer.

9. The method of claim 6, wherein the gestures comprise a plurality of motion epochs.

10. The method of claim 6, wherein the filtered version of the derivative of the signal is an output of a Gaussian low pass filter.

11. A system for controlling an autonomous robot, the system comprising:

the autonomous robot;

a wearable device on a user comprising:

one or more sensors embedded in the wearable device, at least one memory storing instructions for detecting one or more gestures, and at least one processor configured to execute the instructions thereby causing the at least one processor to:

detect one or more signals received from the one or more sensors wherein the one or more signals correspond to gestures associated with a user;

determine a derivative of a magnitude of acceleration of a signal of the one or more signals associated with a sensor of the one or more sensors, wherein the magnitude of acceleration is based on an output of an accelerometer on each axis of a cartesian coordinate system;

determine a motion epoch associated with the gestures based on a filtered version of the derivative of the signal;

determine a predicted gesture corresponding to the motion epoch using a gesture prediction model; and send one or more control signals to the autonomous robot in response to the predicted gesture, wherein the control signals are configured to cause the autonomous robot to perform physical movements.

12. System of claim 11, wherein the one or more sensors comprise a gyroscope, and magnetometer.

13. The system of claim 12, wherein the signal is an accelerometer signal generated by the accelerometer.

14. The system of claim 11, wherein the gestures comprise a plurality of motion epochs.

15. The system of claim 11, wherein the filtered version of the derivative of the signal is an output of a Gaussian low pass filter.

\* \* \* \* \*